US009727364B2

United States Patent
Tsirkin

(10) Patent No.: US 9,727,364 B2
(45) Date of Patent: Aug. 8, 2017

(54) VIRTUAL DEVICE HYPERVISOR MEMORY LIMITED RECEIVE QUEUING

(71) Applicant: Red Hat Israel, LTD, Raanana (IL)

(72) Inventor: Michael Tsirkin, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/479,202

(22) Filed: Sep. 5, 2014

(65) Prior Publication Data

US 2016/0070585 A1  Mar. 10, 2016

(51) Int. Cl.
 *G06F 9/455* (2006.01)
 *G06F 9/50* (2006.01)

(52) U.S. Cl.
 CPC ...... *G06F 9/45558* (2013.01); *G06F 9/45533* (2013.01); *G06F 9/50* (2013.01); *G06F 2009/45583* (2013.01); *G06F 2009/45595* (2013.01)

(58) Field of Classification Search
 CPC .................................................. G06F 9/45533
 USPC ............................................................. 718/1
 See application file for complete search history.

(56) References Cited

U.S. PATENT DOCUMENTS

| | | | |
|---|---|---|---|
| 7,853,960 B1 | 12/2010 | Agesen et al. | |
| 8,291,135 B2* | 10/2012 | Subramanian | G06F 9/45558 710/39 |
| 8,665,893 B2 | 3/2014 | Tsirkin et al. | |
| 8,745,237 B2 | 6/2014 | Tsirkin et al. | |
| 2012/0033673 A1 | 2/2012 | Goel | |
| 2013/0055245 A1* | 2/2013 | Tsirkin | G06F 9/545 718/1 |
| 2013/0089106 A1 | 4/2013 | Tsirkin et al. | |
| 2013/0132620 A1 | 5/2013 | de Goede | |
| 2013/0227562 A1 | 8/2013 | Tsirkin et al. | |
| 2014/0064293 A1 | 3/2014 | Deisinger et al. | |
| 2014/0219287 A1* | 8/2014 | Birke | H04L 47/621 370/412 |
| 2014/0334301 A1* | 11/2014 | Billaud | H04L 47/782 370/230.1 |

OTHER PUBLICATIONS

No Author, "Advanced Virtualization I/O Queuing Technologies, an Intel-Microsoft Perspective," Technical White Paper, 2009, pp. 1-4, Intel Corporation and Microsoft Corporation, World Wide Web, http://www.intel.in/content/dam/www/public/us/en/documents/white-papers/advanced-virtualization-i-o-queuing-technologies-paper.pdf.

(Continued)

*Primary Examiner* — Qing Chen
*Assistant Examiner* — Clint Thatcher
(74) *Attorney, Agent, or Firm* — Lowenstein Sandler LLP

(57) ABSTRACT

A hypervisor retrieves a packet written by a guest operating system of a virtual machine from hypervisor memory accessible to the guest operating system. The Hypervisor then adds the packet of the guest operating system to at least one receive queue associated with a virtual device. The hypervisor pauses the retrieving of additional packets from the guest upon determining that the at least one receive queue size has met a first predetermined threshold condition. The hypervisor processes queued packets from the at least one receive queue sequentially. The hypervisor restarts the retrieving of the additional packets from the guest upon determining that the at least one receive queue size has met a second predetermined threshold condition.

20 Claims, 6 Drawing Sheets

(56) References Cited

OTHER PUBLICATIONS

Shikha R. Thakur et al., "Review on Xen Hypervisor," International Journal of Advance Foundation and Research in Computer (IJAFRC), May 2014, pp. 54-59, vol. 1, Issue 5, IJAFRC, World Wide Web, http://www.ijafrc.org/Volumn1/Vol_issue5/7.pdf.

* cited by examiner

VIRTUAL DEVICE HYPERVISOR MEMORY LIMITED RECEIVE QUEUING

TECHNICAL FIELD

The present disclosure is generally related to computer systems, and more particularly, to shared device packet processing in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system of the virtual machine is typically referred to as the "guest operating system."

One resource managed by the host machine is a networking device that may be used by multiple virtual machines operating at the same time. Each virtual machine is assigned a different and unique network address, such as a virtual LAN (VLAN) tag and/or a media access control (MAC) address, or some other combination of data in a packet header. The networking device can have multiple queues for managing incoming packets to be received by a virtual machine and outgoing packets transmitted by a virtual machine. Dedicated queues may be used which are mapped to a specific hardware address and dedicated to a specific virtual machine. In addition, shared queues may be employed which are shared by multiple virtual machines.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
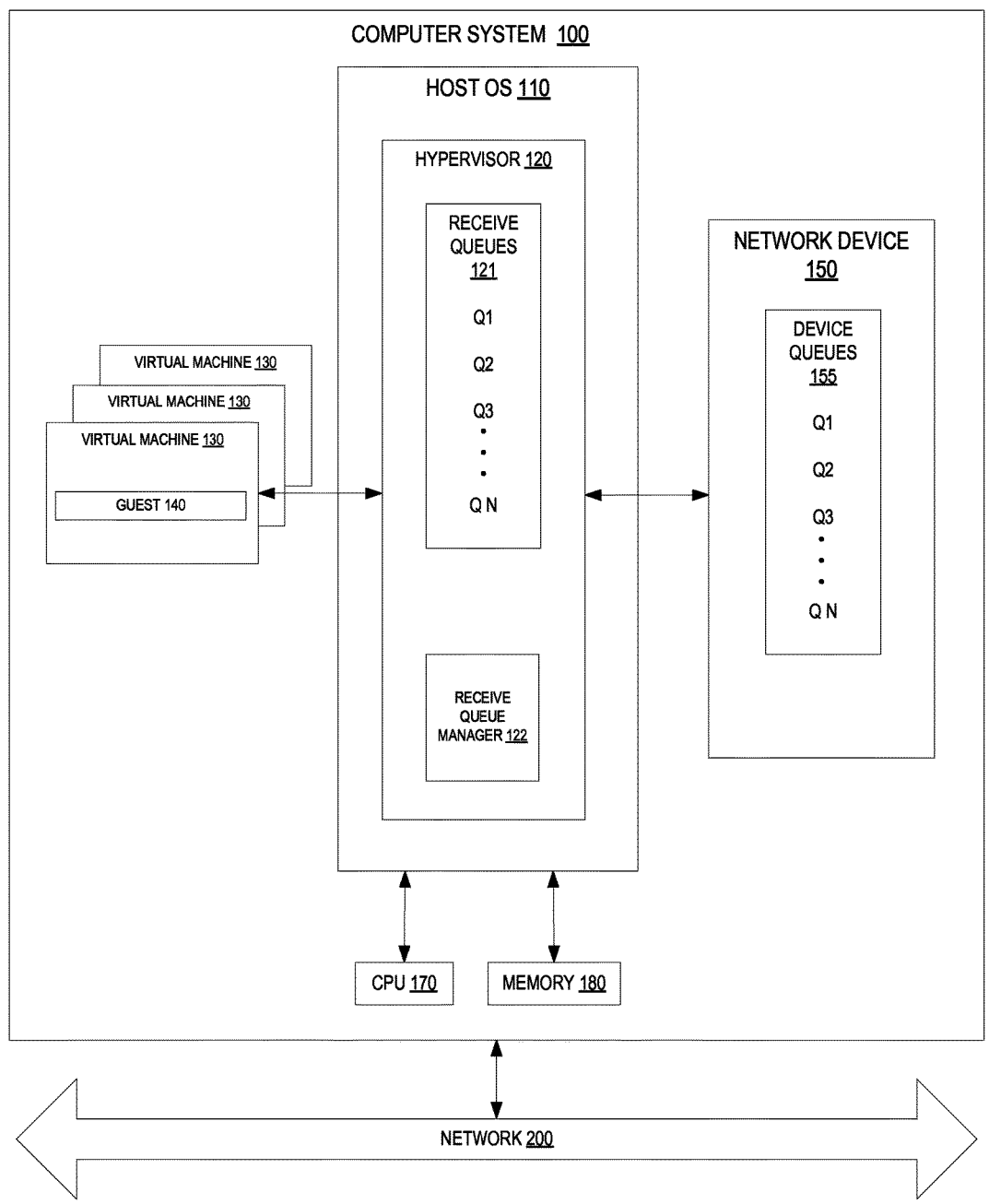
FIG. 1 depicts a high-level component diagram of an example computer system architecture, in accordance with one or more aspects of the present disclosure.

Described herein are methods and systems by which a hypervisor manages packet retrieval and processing using memory limited receive queuing.

One resource managed by a host machine is a networking device that may be used by multiple virtual machines operating at the same time. The networking device can have multiple queues for managing incoming packets to be received by a virtual machine and outgoing packets transmitted by a virtual machine. Typically, a guest can notify the hypervisor that a packet is available for processing. Upon receiving the notification from the guest, the hypervisor can copy the packet into hypervisor memory, and immediately begin processing it. This may permit a guest to queue another packet while the hypervisor is processing the current packet. Resources permitting, the hypervisor can begin processing this second packet without waiting until the first packet is processed. Since packet processing is not limited or controlled, a spike in VM activity can place the hypervisor in a state where it may attempt to process a large number of packets at the same time. This can cause the hypervisor to consume resources to the point of filling up memory or slowing down system performance.

Aspects of the present disclosure address the above noted deficiency by implementing an intermediate receive queue to control the flow of packets processed by the hypervisor. In an illustrative example, the hypervisor retrieves a packet written by a guest operating system of a virtual machine from hypervisor memory accessible to the guest operating system. In certain implementations, retrieving a packet of the guest operating system may include copying the packet into hypervisor memory that is not guest accessible. Alternatively, the hypervisor may lock, or "pin" the packet into guest accessible memory, meaning that the guest may not be able to update the area of memory.

Once the packet has been retrieved, the hypervisor can add the packet of the guest operating system to a receive queue associated with a virtual device. A virtual device may be a data structure in a shared memory location that is accessible to both the VM and the hypervisor. The receive queue may be an area of hypervisor memory that is not directly accessible to the guest operating system. The size of the receive queue can be set to a predetermined size in order to limit the amount of resources that can be consumed by processing packets from virtual machines. In certain implementations, adding a packet to a receive queue may be accomplished by copying the packet from one area of hypervisor memory to the receive queue. Alternatively, the hypervisor may add a pointer to the receive queue that directs the hypervisor to the memory location of the retrieved packet.

The hypervisor may then start processing the packets sequentially. For example, the packets may be processed in a first-in-first-out (FIFO) sequence, where the next packet in the queue is not processed until the processing of the prior packet has been completed. In certain implementations, packet processing can occur in the same thread as packet retrieval. Alternatively, packet processing can occur in a separate thread executing in parallel with packet retrieval.

Once the hypervisor places a retrieved packet on a receive queue, the hypervisor may then determine the size of the receive queue. In some implementations, the hypervisor may keep a counter of the number of packets in the queue. When a packet is added to the queue, the counter can be incremented and when a packet is removed from the queue, the counter can be decremented. Alternatively, the hypervisor may use the total amount of memory used by packets stored in the queue to monitor the queue size. If the size of the receive queue has met a first predetermined threshold condition, the hypervisor may pause the retrieving of additional packets from the guest. In certain implementations, the first predetermined threshold condition may be a maximum size threshold, indicating that the number of packets in the queue is too high to continue retrieving new packets. This threshold can be configurable by an administrator or automatically adjusted by the hypervisor based on usage statistics. In an illustrative example, the hypervisor can suspend retrieving additional packets of the guest for a specific period of time before rechecking the queue size. Alternatively, the hypervisor may terminate packet retrieval and restart it at a later time (e.g., when the size of the receive queue has lowered to meet a second threshold condition). In certain implementations, the hypervisor can notify the guest operating system that retrieving new packets has been paused. The hypervisor may notify the guest via, for example, an interrupt request or a message written to a data structure in a shared memory location.

As noted above, the packets may be processed in a (FIFO) sequence, where the next packet in the queue is not processed until the processing of the prior packet has been completed. The hypervisor may check the size of the receive queue to determine if there are any packets waiting to be processed. If the receive queue is empty (e.g. the size of the receive queue is equal to 0), then packet processing can be terminated until the hypervisor retrieves a new packet of the guest and adds it to a receive queue. If there are queued packets waiting for processing, the hypervisor can remove the first packet from the beginning of the receive queue. In some implementations, the hypervisor can delete the packet from the memory location associated with the queue. Alternatively, the hypervisor may update a pointer that identifies the beginning of the receive queue such that the pointer identifies the next available packet in the queue without altering the memory location. Once the hypervisor removes the packet from the receive queue, it can then process the packet accordingly. For example, the hypervisor may pass the packet to an alternate virtual device, pass the packet to an application executing on the hypervisor, pass the packet to another virtual machine, place the packet on a transmit queue of a network device, pass the packet to a physical device, or perform any other similar networking function. The hypervisor may pass a packet by copying the packet to another memory location, by copying a pointer to a shared memory location, or in any other similar manner.

Once the packet has been processed completely, the hypervisor can then check the size of the queue to determine if there are additional packets to be processed. If the size of the queue does not meet a second predetermined threshold condition, the hypervisor can begin processing the next packet on the queue without restarting the retrieving of new packets from the guest. In certain implementations, the second predetermined threshold condition may be a minimum size threshold that indicates that the number of packets in the queue is now low enough to allow packet retrieval to be restarted. This threshold can be configurable by an administrator or automatically adjusted by the hypervisor based on usage statistics. Once the receive queue size has lowered such that the second predetermined threshold condition has been met, the hypervisor may restart retrieving of additional packets. In certain implementations, the hypervisor can notify the guest operating system that retrieving new packets has been restarted. The hypervisor may notify the guest via, for example, an interrupt request or a message written to a data structure in a shared memory location.

A single receive queue may be associated with the virtual device. Alternatively, a group of receive queues may be associated with the virtual device. The hypervisor may determine which of the receive queues associated with the virtual device have met a predetermined maximum size threshold condition when determining whether to pause retrieving additional packets. The hypervisor may first determine the queue size for each receive queue associated with the virtual device. Upon assessing the queue size for each receive queue, the hypervisor may then determine the total number of receive queues that have a queue size that meets the predetermined maximum size threshold condition. If this number meets a third predetermined threshold condition, the hypervisor may pause retrieving additional packets for all receive queues associated with the virtual device. Alternatively, the hypervisor may only pause retrieving additional packets only for those receive queues with a size meeting the predetermined maximum size threshold, while the other receive queues remain active. In one illustrative example, the third predetermined threshold condition may be set so that it requires all receive queues to have a queue size that meets a maximum size threshold. Alternatively, the third predetermined threshold condition may be set so that it requires only a particular number of receive queues to have a queue size that meets a maximum size threshold.

Aspects of the present disclosure are thus capable of limiting the memory consumed during packet processing. More particularly, aspects of the present disclosure prevent hypervisor memory and CPU resources from being exhausted during spikes in VM packet production, providing a more constant flow of packets to the hypervisor during periods of heavy activity.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 is connected to a network 200 and may comprise host OS 110, network device 150, and multiple virtual machines (VM) 130. Each VM 130 is a software implementation of a machine that executes programs as though it were an actual physical machine, and runs a guest (e.g., guest 140) that uses a guest operating system to manage its resources. Host OS 110 manages the hardware resources of the computer system and provides functions such as inter-process communication, scheduling, memory management, and so forth. The VMs 130 may run the same or different guest operating systems, such as Microsoft Windows®, Linux®, Solaris®, Mac® OS, etc.

The computer system 100 may be a server, a mainframe, a workstation, a personal computer (PC), a mobile phone, a palm-sized computing device, etc. The network 200 may be a private network (e.g., a local area network (LAN), a wide area network (WAN), intranet, etc.) or a public network (e.g., the Internet).

The computer system 100 may also comprise hardware components such as one or more physical central processing units (CPUs) 170, host memory 180, and other hardware components. Host memory 180 may include volatile memory devices (e.g., random access memory (RAM)), non-volatile memory devices (e.g., flash memory) and/or other types of memory devices. The computer system 100 may also comprise a network device 150 communicatively coupled to the guest 140 via receive paths managed by the hypervisor 120. During operation, each guest 140 can interact with the host OS 110 via a virtual machine 130 having a specific network address (herein the "virtual machine address"). The virtual machine address may be any suitable protocol or format, including a virtual LAN (VLAN) tag and/or a media access control (MAC) address. Each virtual machine address can be assigned to one or more of the device queues 155 (i.e., Q1, Q2, Q3, . . . QN) maintained by the network device 150. One having ordinary skill in the art will appreciate that the device queues 155 may be a collection of dedicated queues and shared queues.

Host OS 110 may comprise a hypervisor 120, which provides a virtual operating platform for VMs 130 and manages their execution. Hypervisor 120 may comprise receive queue manager 122 configured to manage one or more receive queues 121 (i.e., Q1, Q2, Q3, . . . QN). It should be noted that in some alternative implementations, hypervisor 120 may be external to host OS 110, rather than embedded within host OS 110, or may replace host OS 110.

Receive queue manager 122 can retrieve packets written to guest accessible hypervisor memory by guest 140, add the packets to one of the of the receive queues 121, and determine whether or not to pause packet retrieval based on a first predetermined threshold condition, as described in detail below with respect to FIG. 3. Additionally, receive queue manager 122 can process the packets added to receive queues 121, and restart packet retrieval based on a second predetermined threshold condition, as described in detail below with respect to FIG. 4. In some implementations, receive queue manager 122 can manage multiple packet retrieval and processing for multiple receive queues associated with the same virtual device, as described in detail below with respect to FIG. 5.

Figure 2:
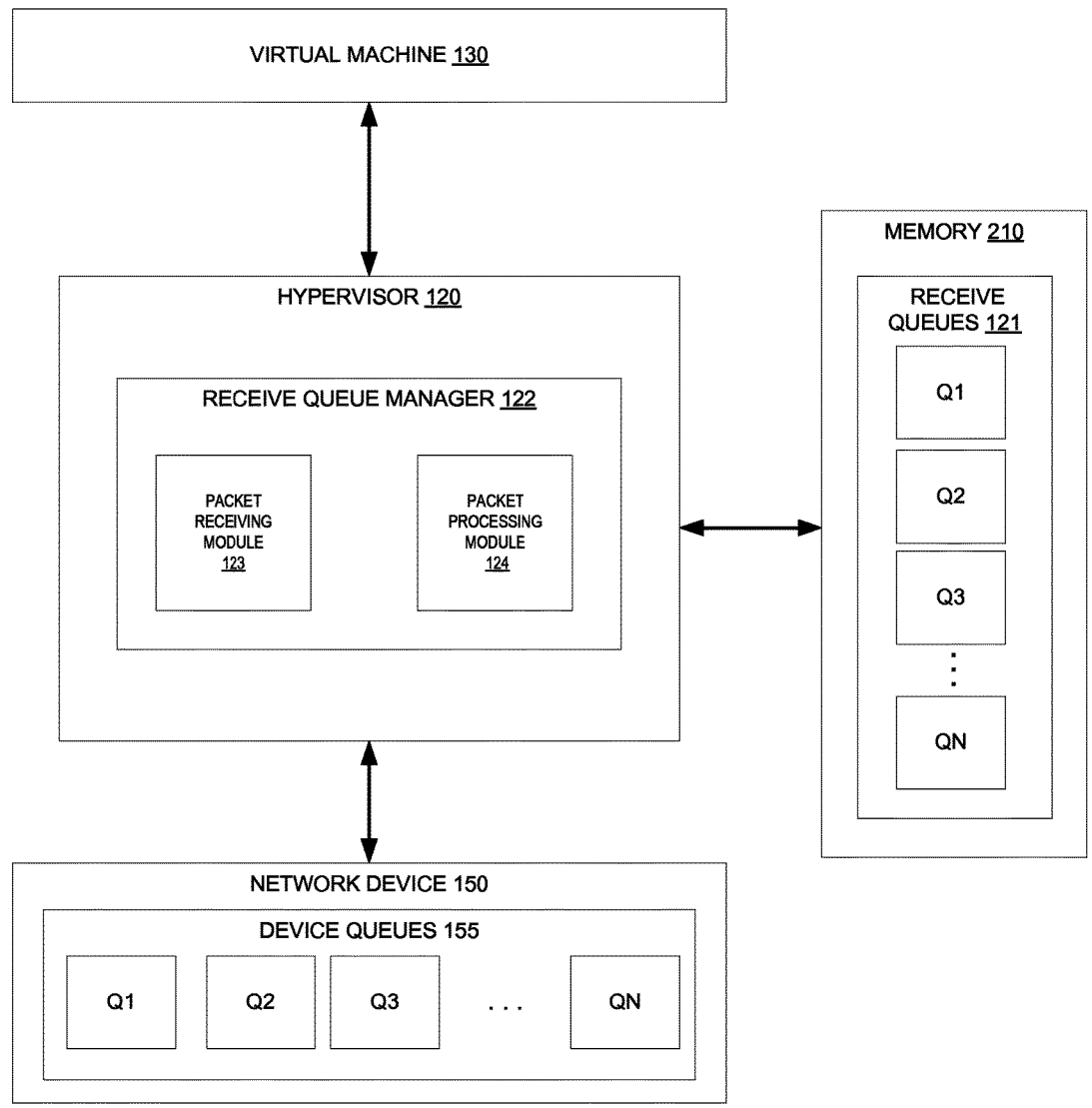
FIG. 2 depicts a block diagram of an example system for shared device packet processing, in accordance with one or more aspects of the present disclosure.

FIG. 2 is a block diagram of an example system for shared device packet processing, which may comprise a hypervisor 120, a network device 150, and a virtual machine 130 in a virtual machine system, in accordance with one or more aspects of the present disclosure. As shown in FIG. 2, the hypervisor 120 includes a receive queue manager 122 configured to manage packet retrieval and processing for one or more selected receive queues, according to the exemplary process flow described below in connection with FIGS. 3-5. Receive queue manager 122 may comprise packet receiving module 123 and packet processing module 124. In certain implementations, packet receiving module 123 and packet processing module 124 may execute in the same processing thread. Alternatively, packet receiving module 123 and packet processing module 124 may execute in parallel using separate threads.

Packet receiving module 123 can retrieve packets written to guest accessible hypervisor memory by guest 140, add the packets to one of the of the receive queues 121, and determine whether or not to pause packet retrieval based on a first predetermined threshold condition, as described in detail below with respect to FIG. 3. Packet processing module can process the packets added to receive queues 121, and restart packet retrieval based on a second predetermined threshold condition, as described in detail below with respect to FIG. 4.

The receive queue manager 122 may be connected to a memory 210 associated with the hypervisor 120. The memory 210 can be configured to store the received packets including packet information. As used herein, the term "packet information" includes any information identifying the packet, including but not limited to, associated pointer information, a timestamp identifying the time the packet was received (i.e., the packet receipt time), an IP address, a MAC address, a VLAN tag, etc.

Figure 3:
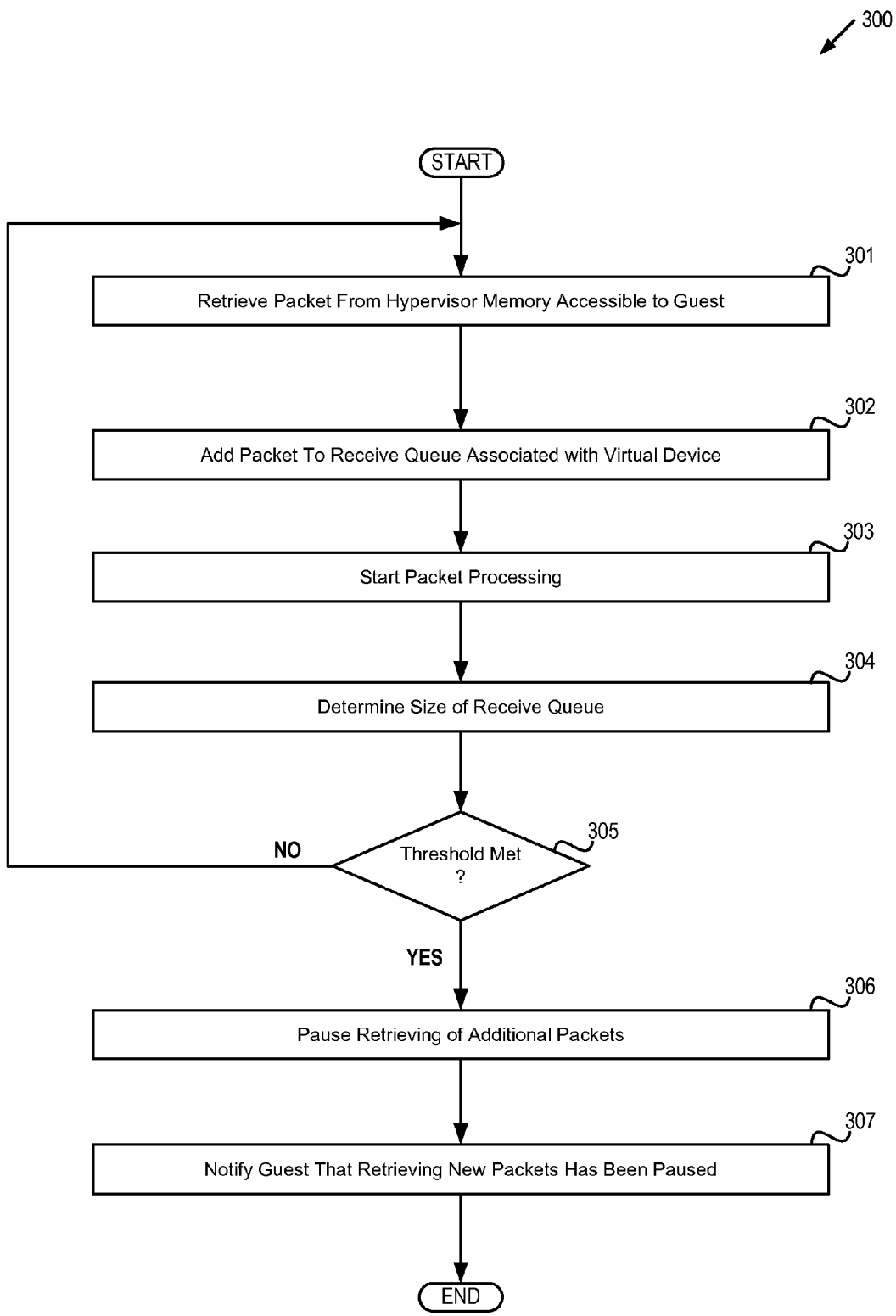
FIG. 3 depicts a flow diagram of a method for managing packet retrieval associated with a receive queue, in accordance with one or more aspects of the present disclosure.

FIG. 3 depicts a flow diagram of an example method 300 for managing packet retrieval associated with a receive queue. The method may be performed by processing logic that may comprise hardware (circuitry, dedicated logic, etc.), software (such as is run on a general purpose computer system or a dedicated machine), or a combination of both. In one illustrative example, method 300 may be performed by receive queue manager 122 of hypervisor 120 in FIG. 1. Alternatively, some or all of method 300 might be performed by another machine. It should be noted that blocks depicted in FIG. 3 could be performed simultaneously or in a different order than that depicted.

At block 301, processing logic retrieves a packet written by a guest operating system of a virtual machine from hypervisor memory accessible to the guest operating system. In certain implementations, processing logic may retrieve a packet of the guest operating system by copying the packet into hypervisor memory that is not guest accessible. Alternatively, processing logic may lock, or "pin" the packet into guest accessible memory, meaning that the guest will not be able to update the area of memory.

At block 302, processing logic can add the packet of the guest operating system to a receive queue associated with a virtual device. A virtual device may be a data structure in a shared memory location that is accessible to both the VM and the hypervisor. The receive queue may be an area of hypervisor memory that is not directly accessible to the guest operating system. The size of the receive queue can be set to a predetermined size in order to limit the amount of resources that can be consumed by processing packets from virtual machines. In certain implementations, adding a packet to a receive queue may be accomplished by copying the packet from one area of hypervisor memory to the receive queue. Alternatively, processing logic may add a pointer to the receive queue that directs the hypervisor to the memory location of the retrieved packet.

At block 303, processing logic may then start processing the packets sequentially. For example, the packets may be processed in a first-in-first-out (FIFO) sequence, where the next packet in the queue is not processed until the processing of the prior packet has been completed. In certain implementations, packet processing can occur in the same thread as packet retrieval. Alternatively, packet processing can occur in a separate thread executing in parallel with packet retrieval. Processing logic may pass the packet to an alternate virtual device, pass the packet to an application executing on the hypervisor, pass the packet to another virtual machine, place the packet on a transmit queue of a network device, pass the packet to a physical device, or perform any other similar networking function. The hypervisor may pass a packet by copying the packet to another memory location, by copying a pointer to a shared memory location, or in any other similar manner.

At block 304, processing logic may determine the size of the receive queue. In some implementations, processing logic may keep a counter of the number of packets in the queue. When a packet is added to the queue, the counter can be incremented. Alternatively, processing logic may use the total amount of memory used by packets stored in the queue to monitor the queue size.

At block 305, processing logic determines whether the size of the receive queue has met a first predetermined threshold condition. If so, execution proceeds to block 306, otherwise, execution returns to block 301 to retrieve a new packet. In certain implementations, the first predetermined threshold condition may be a maximum size threshold, indicating that the number of packets in the queue is too high to continue retrieving new packets. This threshold can be configurable by an administrator or automatically adjusted by the hypervisor based on usage statistics.

At block 306, processing logic may pause the retrieving of additional packets from the guest. In some implementations, processing logic can suspend retrieving additional packets from the guest for a specific period of time before rechecking the queue size. Alternatively, processing logic may terminate packet retrieval until it is restarted at a later time (e.g., when the size of the receive queue has lowered to meet a second threshold condition).

At block 307, processing logic can notify the guest operating system that retrieving new packets has been paused. Processing logic may notify the guest via, for example, an interrupt request or a message written to a data structure in a shared memory location.

After block 307, the method of FIG. 3 terminates.

Figure 4:
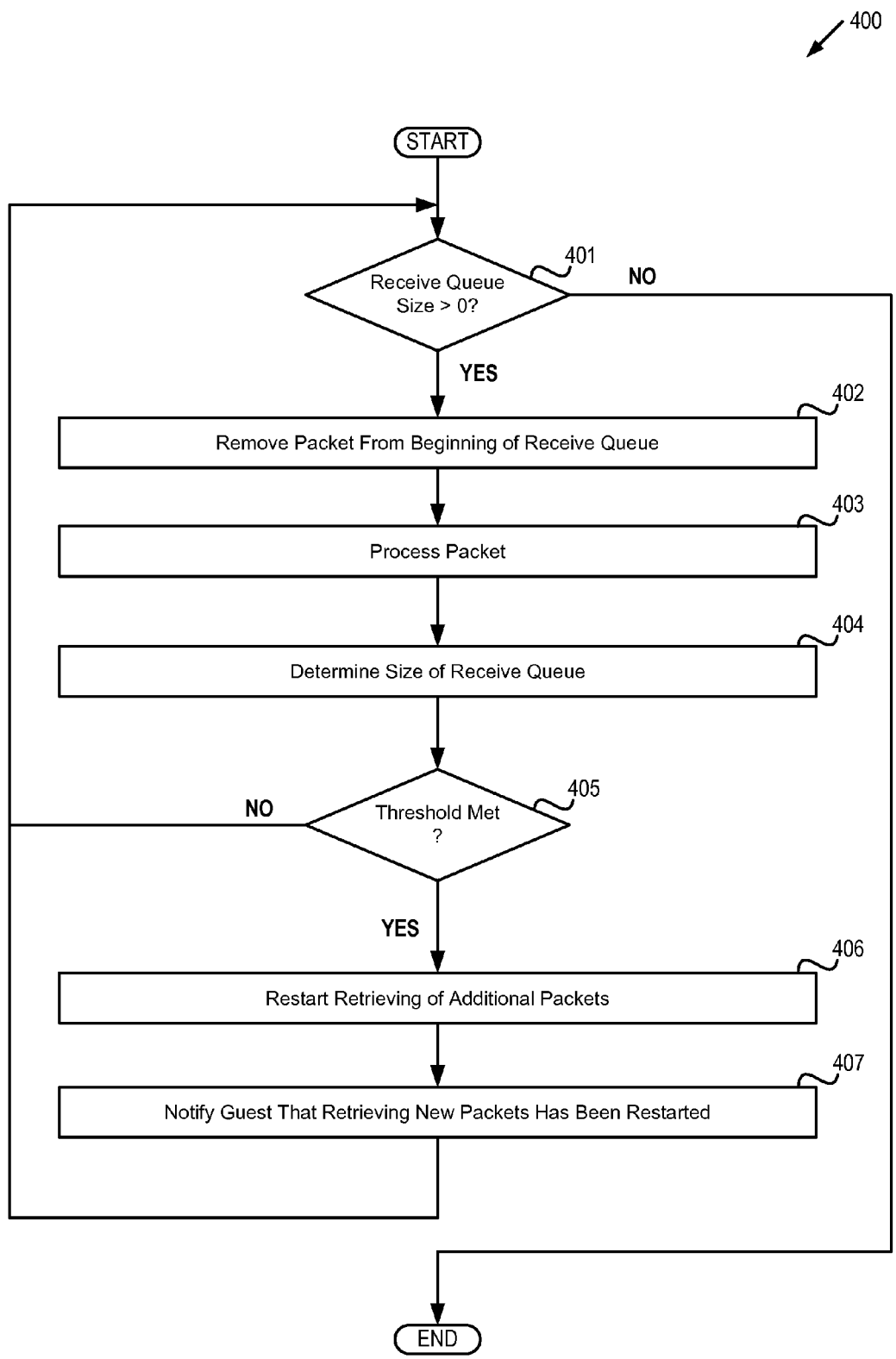
FIG. 4 depicts a flow diagram of a method for managing packet processing associated with a receive queue, in accordance with one or more aspects of the present disclosure.

FIG. 4 depicts a flow diagram of an example method 400 for managing packet processing associated with a receive queue. The method may be performed by processing logic that may comprise hardware (circuitry, dedicated logic, etc.), software (such as is run on a general purpose computer system or a dedicated machine), or a combination of both. In one illustrative example, method 400 may be performed by receive queue manager 122 of hypervisor 120 in FIG. 1. Alternatively, some or all of method 400 might be performed by another machine. It should be noted that blocks depicted in FIG. 4 could be performed simultaneously or in a different order than that depicted.

At block 401, processing logic may check the size of the receive queue to determine if there are any packets waiting to be processed. If the receive queue is empty, then the method of FIG. 4 terminates. Otherwise, execution proceeds to block 402.

At block 402, processing logic can remove the first packet from the beginning of the receive queue. In some implementations, processing logic can delete the packet from the memory location associated with the queue. Alternatively, processing logic may update a pointer that identifies the beginning of the receive queue such that the pointer identifies the next available packet in the queue without altering the memory location.

At block 403, processing logic may process the packet. Processing logic may pass the packet to an alternate virtual device, pass the packet to an application executing on the hypervisor, pass the packet to another virtual machine, place the packet on a transmit queue of a network device, pass the packet to a physical device, or perform any other similar networking function. The hypervisor may pass a packet by copying the packet to another memory location, by copying a pointer to a shared memory location, or in any other similar manner.

At block 404, processing logic may determine the size of the receive queue. In some implementations, processing logic may keep a counter of the number of packets in the queue. When a packet is removed from the queue, the counter can be decremented. Alternatively, processing logic may use the total amount of memory used by packets stored in the queue to monitor the queue size.

At block 405, processing logic determines whether the size of the receive queue has met a second predetermined threshold condition. If so, execution proceeds to block 406, otherwise, execution returns to block 401 to remove the next packet from the receive queue for processing. In certain implementations, the second predetermined threshold condition may be a minimum size threshold that indicates that the number of packets in the queue is now low enough to allow packet retrieval to be restarted. This threshold can be configurable by an administrator or automatically adjusted by the hypervisor based on usage statistics.

At block 406, processing logic may restart retrieving of additional packets. At block 407, processing logic can notify the guest operating system that retrieving new packets has been restarted. Processing logic may notify the guest via, for example, an interrupt request or a message written to a data structure in a shared memory location.

After block 407, execution returns to block 401.

Figure 5:
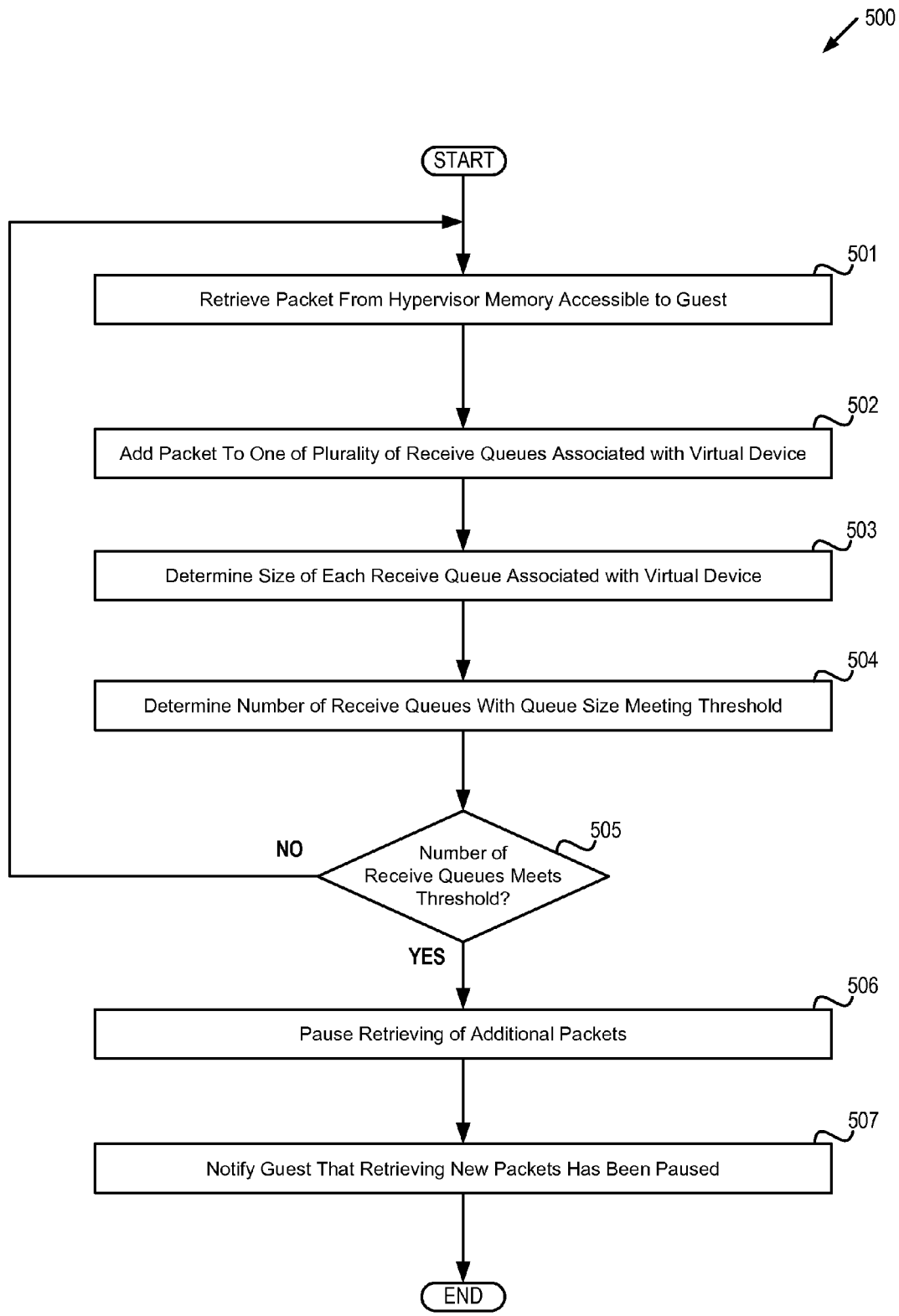
FIG. 5 depicts a flow diagram of a method for managing packet retrieval associated with multiple receive queues, in accordance with one or more aspects of the present disclosure.

FIG. 5 depicts a flow diagram of an example method 500 for managing packet retrieval associated with multiple receive queues. The method may be performed by processing logic that may comprise hardware (circuitry, dedicated logic, etc.), software (such as is run on a general purpose computer system or a dedicated machine), or a combination of both. In one illustrative example, method 500 may be performed by receive queue manager 122 of hypervisor 120 in FIG. 1. Alternatively, some or all of method 500 might be performed by another machine. It should be noted that blocks depicted in FIG. 5 could be performed simultaneously or in a different order than that depicted.

At block 501, processing logic retrieves a packet written by a guest operating system of a virtual machine from hypervisor memory accessible to the guest operating system. In certain implementations, processing logic may retrieve a packet of the guest operating system by copying the packet into hypervisor memory that is not guest accessible. Alternatively, processing logic may lock, or "pin" the packet into guest accessible memory, meaning that the guest will not be able to update the area of memory.

At block 502, processing logic can add the packet of the guest operating system to any one of a group of receive queues associated with a virtual device. In certain implementations, adding a packet to one of the receive queues may be accomplished by copying the packet from one area of hypervisor memory to the receive queue. Alternatively, processing logic may add a pointer to the receive queue that directs the hypervisor to the memory location of the retrieved packet.

At block 503, processing logic may determine the size of each of the receive queues associated with the virtual device. In some implementations, processing logic may keep a counter of the number of packets in each queue. When a packet is added to a queue, the counter can be incremented. Alternatively, processing logic may use the total amount of memory used by packets stored in each queue to monitor the queue size.

At block 504, processing logic determines the number of receive queues with a queue size meeting a first predetermined threshold. In certain implementations, the first predetermined threshold condition may be a maximum size threshold, indicating that the number of packets in a queue is too high to continue retrieving new packets for that queue.

At block 505, processing logic determines whether the number of receive queues identified at block 504 meets a third predetermined threshold. If so, execution proceeds to block 506, otherwise, execution returns to bock 501 to retrieve a new packet. In certain implementations, the third predetermined threshold condition may be set so that it requires all receive queues to have a queue size that meets a maximum size threshold. Alternatively, the third predetermined threshold condition may be set so that it requires only a particular number of receive queues to have a queue size that meets a maximum size threshold.

At block 506, processing logic may pause the retrieving of additional packets from the guest. In some implementations, processing logic can suspend retrieving additional packets from the guest for a specific period of time before rechecking the queue size. Alternatively, processing logic may terminate packet retrieval until it is restarted at a later time (e.g., when the size of the receive queue has lowered to meet a second threshold condition).

At block 507, processing logic can notify the guest operating system that retrieving new packets has been paused. Processing logic may notify the guest via, for example, an interrupt request or a message written to a data structure in a shared memory location.

After block 507, the method of FIG. 5 terminates.

Figure 6:
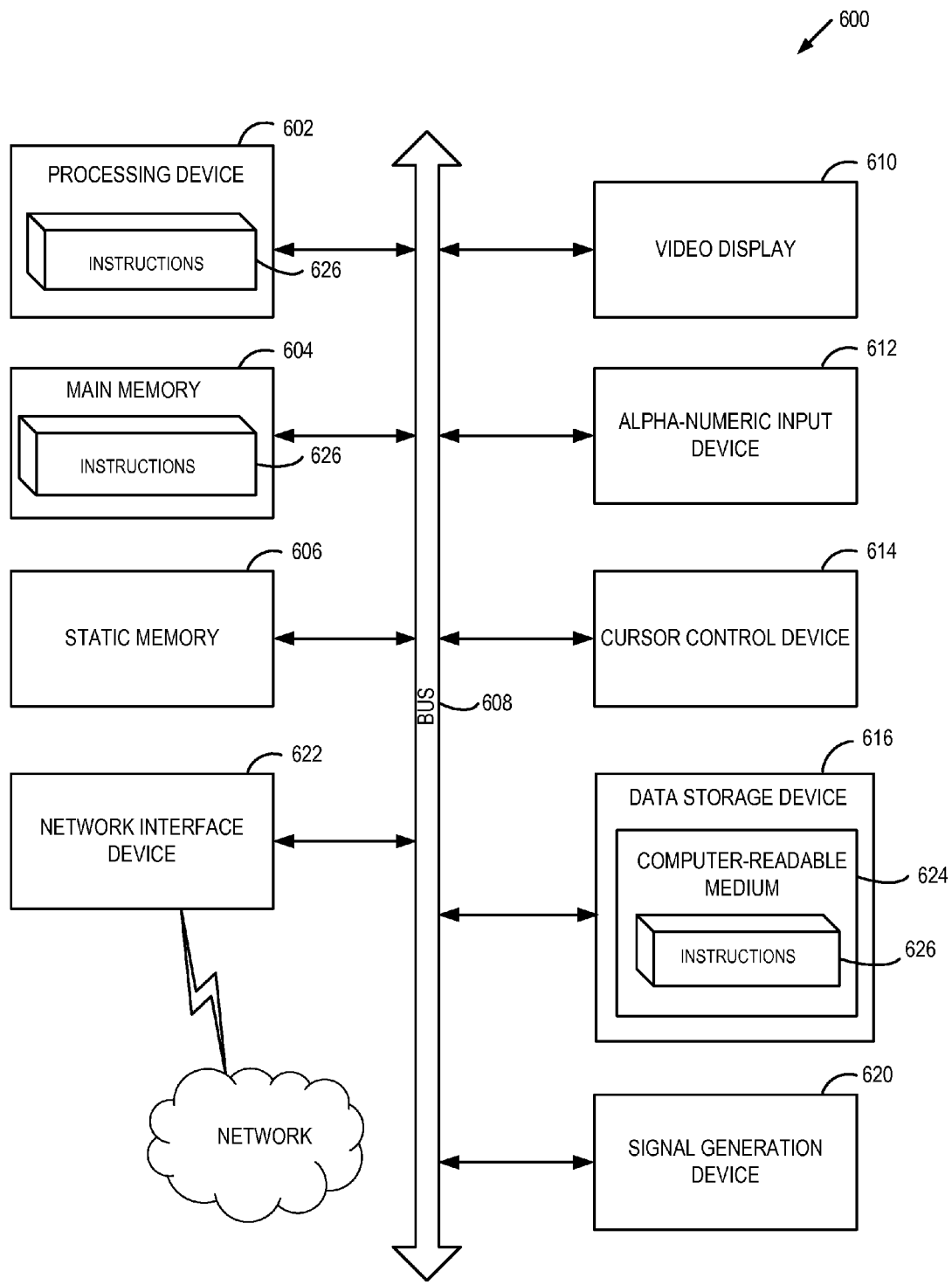
FIG. 6 depicts a block diagram of an illustrative computer system operating in accordance with examples of the invention.

FIG. 6 depicts an example computer system 600 which can perform any one or more of the methods described herein. In one example, computer system 600 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions corresponding to the methods of FIGS. 3-5, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "allocating", "notifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

What is claimed is:

1. A method comprising:
retrieving, by a processing device executing a hypervisor, a packet written by a guest operating system of a virtual machine from a first area of hypervisor memory accessible to the guest operating system;
adding, by the processing device executing the hypervisor, the packet of the guest operating system to at least one receive queue associated with a virtual device, wherein the at least one receive queue utilizes a second area of hypervisor memory, wherein the second area of hypervisor memory is different from the first area of hypervisor memory, and wherein the second area of hypervisor memory is not directly accessible to the guest operating system while the guest operating system is running;
pausing retrieving of additional packets from the guest upon determining that the at least one receive queue size has met a first determined threshold condition; and
processing queued packets from the at least one receive queue sequentially.

2. The method of claim 1 further comprising notifying the guest operating system of the virtual machine that retrieving new packets has been paused.

3. The method of claim 2 further comprising:
restarting the retrieving of the additional packets from the guest upon determining that the at least one receive queue size has met a second determined threshold condition; and
notifying the guest operating system of the virtual machine that retrieving new packets has been restarted.

4. The method of claim 1, wherein retrieving the packet written by the guest operating system of the virtual machine comprises at least one of copying the packet into hypervisor memory that is not guest accessible, or pinning the packet into guest accessible memory.

5. The method of claim 1, wherein processing the packets from the at least one receive queue comprises at least one of removing the packet from the receive queue, passing the packet to an alternate virtual device, passing the packet to an application executing on the hypervisor, passing the packet to another virtual machine, placing the packet on a transmit queue of a network device, or passing the packet to a physical device.

6. The method of claim 1, wherein the at least one receive queue comprises a plurality of receive queues.

7. The method of claim 6, wherein pausing the retrieving of the additional packets comprises:
determining a number of the plurality of receive queues that have a queue size that has met the first determined threshold condition; and
pausing the retrieving of additional packets for any of the plurality of receive queues upon determining that the number of the plurality of receive queues meets a third determined threshold condition.

8. A computing apparatus comprising:
a memory; and
a processing device, operatively coupled to the memory, to execute a hypervisor to:
retrieve a packet written by a guest operating system of a virtual machine from a first area of hypervisor memory accessible to the guest operating system;
add the packet of the guest operating system to at least one receive queue associated with a virtual device, wherein the at least one receive queue utilizes a second area of hypervisor memory, wherein the second area of hypervisor memory is different from the first area of hypervisor memory, and wherein the second area of hypervisor memory is not directly accessible to the guest operating system while the guest operating system is running;
pause retrieving of additional packets from the guest upon determining that the at least one receive queue size has met a first determined threshold condition; and
process queued packets from the at least one receive queue sequentially.

9. The apparatus of claim 8 wherein the processing device is further to notify the guest operating system of the virtual machine that retrieving new packets has been paused.

10. The apparatus of claim 9 wherein the processing device is further to:
restart the retrieving of the additional packets from the guest upon determining that the at least one receive queue size has met a second determined threshold condition; and notify the guest operating system of the virtual machine that retrieving new packets has been restarted.

11. The apparatus of claim 8, wherein to process the packet from the at least one receive queue, the processing device is to at least one of remove the packet from the receive queue, pass the packet to an alternate virtual device, pass the packet to an application executing on the hypervisor, pass the packet to another virtual machine, placing the packet on a transmit queue of a network device, or pass the packet to a physical device.

12. The apparatus of claim 8, wherein the at least one receive queue comprises a plurality of receive queues.

13. The apparatus of claim 12, wherein to pause the retrieving of additional packets, the processing device is to:
   determine a number of the plurality of receive queues that have a queue size that has met the first determined threshold condition; and
   pause the retrieving of additional packets for any of the plurality of receive queues upon determining that the number of the plurality of receive queues meets a third determined threshold condition.

14. A non-transitory computer readable storage medium, having instructions stored therein, which when executed by a processing device of a computer system, cause the processing device to:
   retrieve, by the processing device executing a hypervisor, a packet written by a guest operating system of a virtual machine from a first area of hypervisor memory accessible to the guest operating system;
   add the packet of the guest operating system to at least one receive queue associated with a virtual device, wherein the at least one receive queue utilizes a second area of hypervisor memory, wherein the second area of hypervisor memory is different from the first area of hypervisor memory, and wherein the second area of hypervisor memory is not directly accessible to the guest operating system while the guest operating system is running;
   pause, by the processing device executing the hypervisor, retrieving of additional packets from the guest upon determining that the at least one receive queue size has met a first determined threshold condition; and
   process, by the processing device executing the hypervisor, queued packets from the at least one receive queue sequentially.

15. The non-transitory computer readable storage medium of claim 14, wherein the processing device is further to notify the guest operating system of the virtual machine that retrieving new packets has been paused.

16. The non-transitory computer readable storage medium of claim 15, wherein the processing device is further to:
   restart the retrieving of the additional packets from the guest upon determining that the at least one receive queue size has met a second determined threshold condition; and
   notify the guest operating system of the virtual machine that retrieving new packets has been restarted.

17. The non-transitory computer readable storage medium of claim 14, wherein to retrieve the packet written by the guest operating system of the virtual machine, the processing device is to at least one of copy the packet into hypervisor memory that is not guest accessible, or pin the packet into guest accessible memory.

18. The non-transitory computer readable storage medium of claim 14, wherein to process the packets from the at least one receive queue, the processing device is to at least one of remove the packet from the receive queue, pass the packet to an alternate virtual device, pass the packet to an application executing on the hypervisor, pass the packet to another virtual machine, place the packet on a transmit queue of a network device, or pass the packet to a physical device.

19. The non-transitory computer readable storage medium of claim 14, wherein the at least one receive queue comprises a plurality of receive queues.

20. The non-transitory computer readable storage medium of claim 19, wherein to pause the retrieving of the additional packets, the processing device is to:
   determine a number of the plurality of receive queues that have a queue size that has met the first determined threshold condition; and
   pause the retrieving of additional packets for any of the plurality of receive queues upon determining that the number of the plurality of receive queues meets a third determined threshold condition.

\* \* \* \* \*